(12) United States Patent
Sugioka

(10) Patent No.: US 9,805,283 B2
(45) Date of Patent: Oct. 31, 2017

(54) IMAGE PROCESSING APPARATUS, IMAGE PROCESSING METHOD AND STORAGE MEDIUM

(71) Applicant: Tatsuroh Sugioka, Kanagawa (JP)

(72) Inventor: Tatsuroh Sugioka, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 15/219,393

(22) Filed: Jul. 26, 2016

(65) Prior Publication Data

US 2017/0039691 A1      Feb. 9, 2017

(30) Foreign Application Priority Data

Aug. 5, 2015 (JP) .................................. 2015-155445
Mar. 24, 2016 (JP) .................................. 2016-060024

(51) Int. Cl.
     *G06K 9/46*      (2006.01)
     *G06T 3/40*      (2006.01)

(52) U.S. Cl.
     CPC .............. *G06K 9/4604* (2013.01); *G06T 3/40* (2013.01)

(58) Field of Classification Search
None
See application file for complete search history.

(56) References Cited

U.S. PATENT DOCUMENTS

| | | | | |
|---|---|---|---|---|
| 5,594,850 A | * | 1/1997 | Noyama | G06T 15/405 345/632 |
| 6,333,752 B1 | * | 12/2001 | Hasegawa | G06F 3/04845 345/581 |
| 2016/0247303 A1 | * | 8/2016 | Aoyama | A61B 6/469 |

FOREIGN PATENT DOCUMENTS

| | | |
|---|---|---|
| JP | 2001-242848 | 9/2001 |
| JP | 2009-122591 | 6/2009 |

* cited by examiner

*Primary Examiner* — Bernard Krasnic
(74) *Attorney, Agent, or Firm* — Harness, Dickey & Pierce, P.L.C.

(57) ABSTRACT

An image processing apparatus for synthesizing a first image including a transparency-process region and a non-transparency region, and a second image includes a memory to store transparency-process color information for performing a transparency-process, and circuitry to extract the non-transparency region and a part of the transparency-process region adjacent with each other as a process target region, comparing a color value of the non-transparency region and the first color value of the transparency-process region, changing the transparency-process color information from a first color value to a second color value depending on a comparison result, the second color value set closer to the color value of the non-transparency region, applying the second color value to the transparency-process region, enlarging the process target region, performing the transparency process to the enlarged process target region based on the second color value; and superimposing the enlarged process target region on the second image.

9 Claims, 13 Drawing Sheets

FIG. 3
R:XXX, G:XXX, B:XXX
FIG. 4
RELATED ART
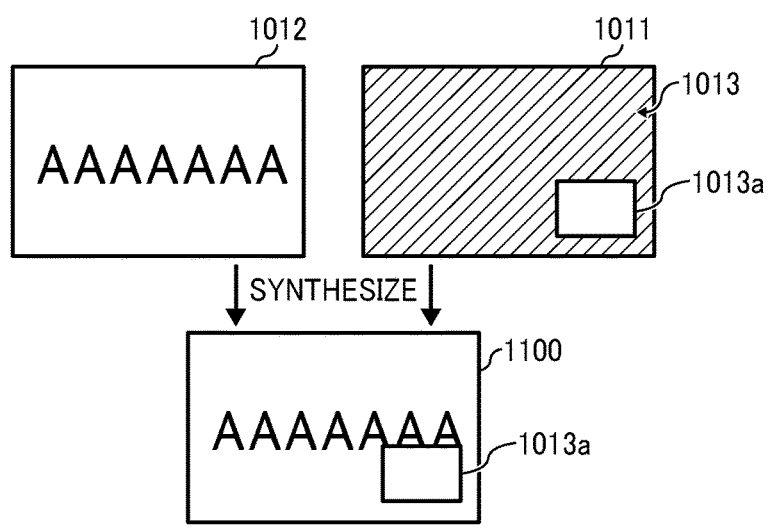
FIG. 5
RELATED ART
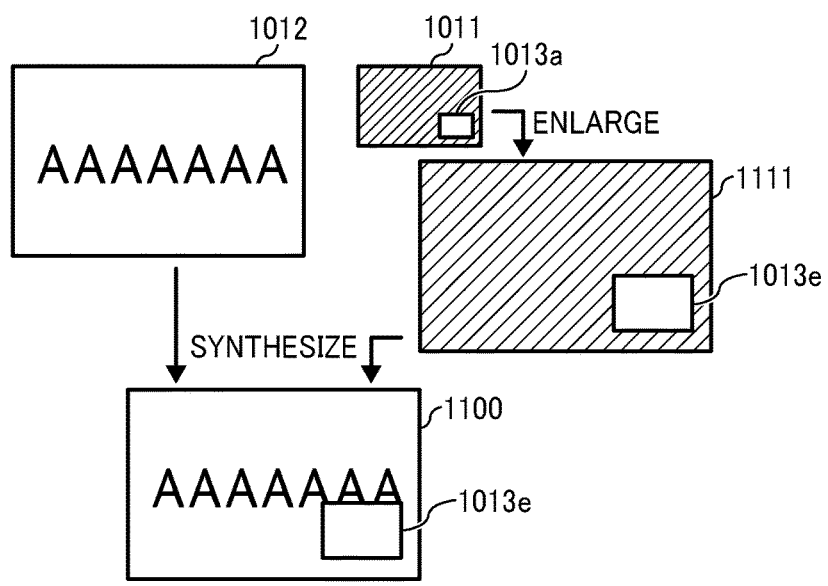

R (MAXIMUM VALUE) : XXX
R (MINIMUM VALUE) : XXX

G (MAXIMUM VALUE) : XXX
G (MINIMUM VALUE) : XXX

B (MAXIMUM VALUE) : XXX
B (MINIMUM VALUE) : XXX

FIG. 12A
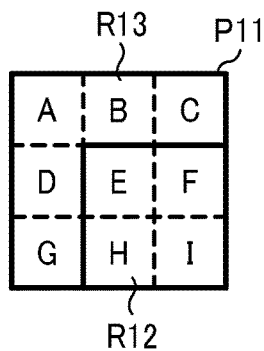
FIG. 12B
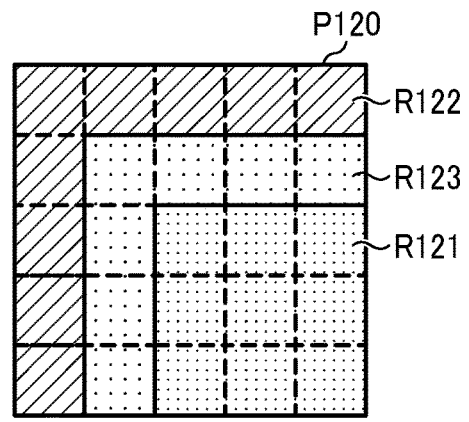
FIG. 13
R: XXX-XXX
G: XXX-XXX
B: XXX-XXX
FIG. 14
| TYPES OF OVERLAY IMAGE | THRESHOLD |
|---|---|
| MENU IMAGE (TRANSPARENCY FOR PERIPHERAL) | XXX |
| SCENE IMAGE (TRANSPARENCY FOR SKY AREA) | XXX |
| . . . | |

IMAGE PROCESSING APPARATUS, IMAGE PROCESSING METHOD AND STORAGE MEDIUM

CROSS-REFERENCE TO RELATED APPLICATION

This application claims priority pursuant to 35 U.S.C. §119(a) to Japanese Patent Application Nos. 2015-155445, filed on Aug. 5, 2015, and 2016-060024, filed on Mar. 24, 2016 in the Japan Patent Office, the disclosure of which are incorporated by reference herein in their entirety.

BACKGROUND

Technical Field

This disclosure relates to an image processing apparatus, an image processing method and a storage medium.

Background Art

The chroma-key synthesis processing can be used to synthesize two images and display a synthesized image on one display apparatus. The chroma-key synthesis processing superimposes an overlay image on a base image. The overlay image includes pixels for a non-transparency portion and pixels having a color designated as a key color. The chroma-key synthesis processing performs the transparency process to the pixels having the color designated as the key color so that the non-transparency portion of the overlay image can be superimposed on the base image so that the overlay image and the base image can be seen as one image. However, noise may occur at a periphery of an edge of the overlay image superimposed on the base image.

SUMMARY

As one aspect of the present invention, an image processing apparatus for synthesizing a first image including a transparency-process region and a non-transparency region, and a second image is devised. The image processing apparatus includes a memory to store a first color value as transparency-process color information useable for performing a transparency-process to the transparency-process region of the first image; and circuitry to extract the non-transparency region and a part of the transparency-process region adjacent with each other existing in the first image as a process target region, to compare a color value of the non-transparency region and the first color value of the transparency-process region adjacent with each other existing in the process target region, to change the transparency-process color information from the first color value to a second color value depending on a comparison result of the color value of the non-transparency region and the first color value of the transparency-process region adjacent with each other existing in the process target region, the second color value set closer to the color value of the non-transparency region, to apply the second color value to the transparency-process region existing in the process target region, to enlarge an image size of the process target region having the transparency-process region applied with the second color in view of an image size of the second image, to perform the transparency process to the enlarged process target region based on the second color value, and to superimpose the enlarged process target region having received the transparency process on the second image to output as an superimposed image.

As another aspect of the present invention, a method of synthesizing a first image including a transparency-process region and a non-transparency region, and a second image is devised. The method includes storing, in a memory, a first color value as transparency-process color information useable for performing a transparency-process to the transparency-process region of the first image, extracting, from the first image, the non-transparency region and a part of the transparency-process region that are adjacent with each other as a process target region, comparing a color value of the non-transparency region and the first color value of the transparency-process region that are adjacent with each other and existing in the process target region, changing the transparency-process color information from the first color value to a second color value depending on a comparison result of the color value of the non-transparency region and the first color value of the transparency-process region, the second color value being set closer to the color value of the non-transparency region, applying the second color value to the transparency-process region existing in the process target region, enlarging an image size of the process target region having the transparency-process region applied with the second color in view of an image size of the second image, performing the transparency process to the enlarged process target region based on the second color value, and superimposing the enlarged process target region having received the transparency process on the second image to output as a superimposed image.

As another aspect of the present invention, a non-transitory storage medium storing a program that, when executed by a computer, causes the computer to execute a method of synthesizing a first image including a transparency-process region and a non-transparency region, and a second image is devised. The method includes storing, in a memory, a first color value as transparency-process color information useable for performing a transparency-process to the transparency-process region of the first image, extracting, from the first image, the non-transparency region and a part of the transparency-process region that are adjacent with each other as a process target region, comparing a color value of the non-transparency region and the first color value of the transparency-process region that are adjacent with each other and existing in the process target region, changing the transparency-process color information from the first color value to a second color value depending on a comparison result of the color value of the non-transparency region and the first color value of the transparency-process region, the second color value being set closer to the color value of the non-transparency region, applying the second color value to the transparency-process region existing in the process target region, enlarging an image size of the process target region having the transparency-process region applied with the second color in view of an image size of the second image, performing the transparency process to the enlarged process target region based on the second color value, and superimposing the enlarged process target region having received the transparency process on the second image to output as a superimposed image.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 is an example of a definition of a key color;

FIG. 4 illustrates an example case that a chroma-key synthesis processing is performed when an overlay image and a base image have the same image size;

FIG. 5 illustrates another example case that a chroma-key synthesis processing is performed when an overlay image and a base image have different image sizes;

FIG. 6 illustrates an enlargement process of image;

FIGS. 7A and 7B illustrates an occurrence of noise when an overlay image is enlarged;

FIGS. 12A and 12B illustrates an overlay image region before and after enlarging the overlay image, in which an edge noise is reduced;

FIG. 13 is another example of a definition of a key color

FIG. 14 is an example of a threshold table of the first example embodiment;

FIG. 19 is a flowchart showing the steps of a dividing process of a rectangle region of the second example embodiment; and.

Figure 1:
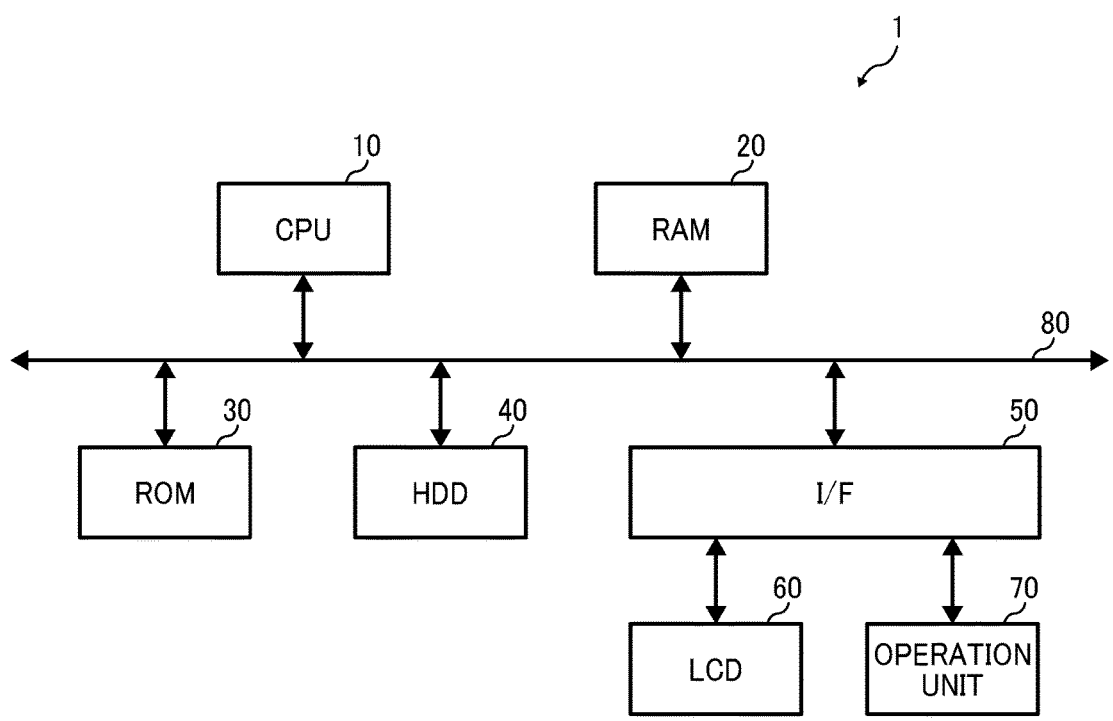
FIG. 1 is an example of a hardware configuration of an image processing apparatus of a first example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more example embodiments are described hereinafter.

A description is given of an information processing apparatus of one or more example embodiments with reference to drawings. Specifically, the information processing apparatus such as a personal computer (PCs) acquires an overlay image and a base image, performs a chroma-key synthesis processing such as a transparency process to a part of the overlay image, and superimposing the transparency-processed overlay image on the base image. As to the image processing apparatus of one or more example embodiments, noise, which may occur due to an enlargement process of the overlay image, can be reduced, and in particular prevented.

FIG. 1 is an example of a hardware configuration of an image processing apparatus 1 of a first example embodiment. As illustrated in FIG. 1, the image processing apparatus 1 can be configured with a configuration similar to known servers and personal computers (PC). Specifically, the image processing apparatus 1 includes, for example, a central processing unit (CPU) 10, a random access memory (RAM) 20, a read only memory (ROM) 30, a hard disk drive (HDD) 40 and interface (I/F) 50, which are connected one to another via a bus 80. Further, the I/F 50 are connected to a liquid crystal display (LCD) 60 and an operation unit 70.

The CPU 10, which is a computing unit such as circuitry or processor. The image processing apparatus 1 controls as a whole. The RAM 20 is a volatile storage medium to which information can be written and read out with high speed, and the RAM 20 is used as a working area of the CPU 10 when the CPU 10 processes information. The ROM 30 is a non-volatile storage medium used as read only memory that stores programs such as firmware. The HDD 40 is a non-volatile storage medium to which information can be written and read out, and the HDD 40 stores operating system (OS) and various control programs and application programs.

The I/F 50 is used to connect the bus 80, various hardware units and a network. The LCD 60 is a visual user interface to display various information. The operation unit 70 is a user interface such as a keyboard and a mouse used by a user to input information to the image processing apparatus 1.

In this hardware configuration, when the CPU 10 performs computing by loading programs, stored in the ROM 30 and an external memory such as the HDD 40, to the RAM 20 to configure a software controller. The functional block of the image processing apparatus 1 can be devised by using the software controller and the above described hardware units.

(Functional Configuration of First Example Embodiment)

Figure 2:
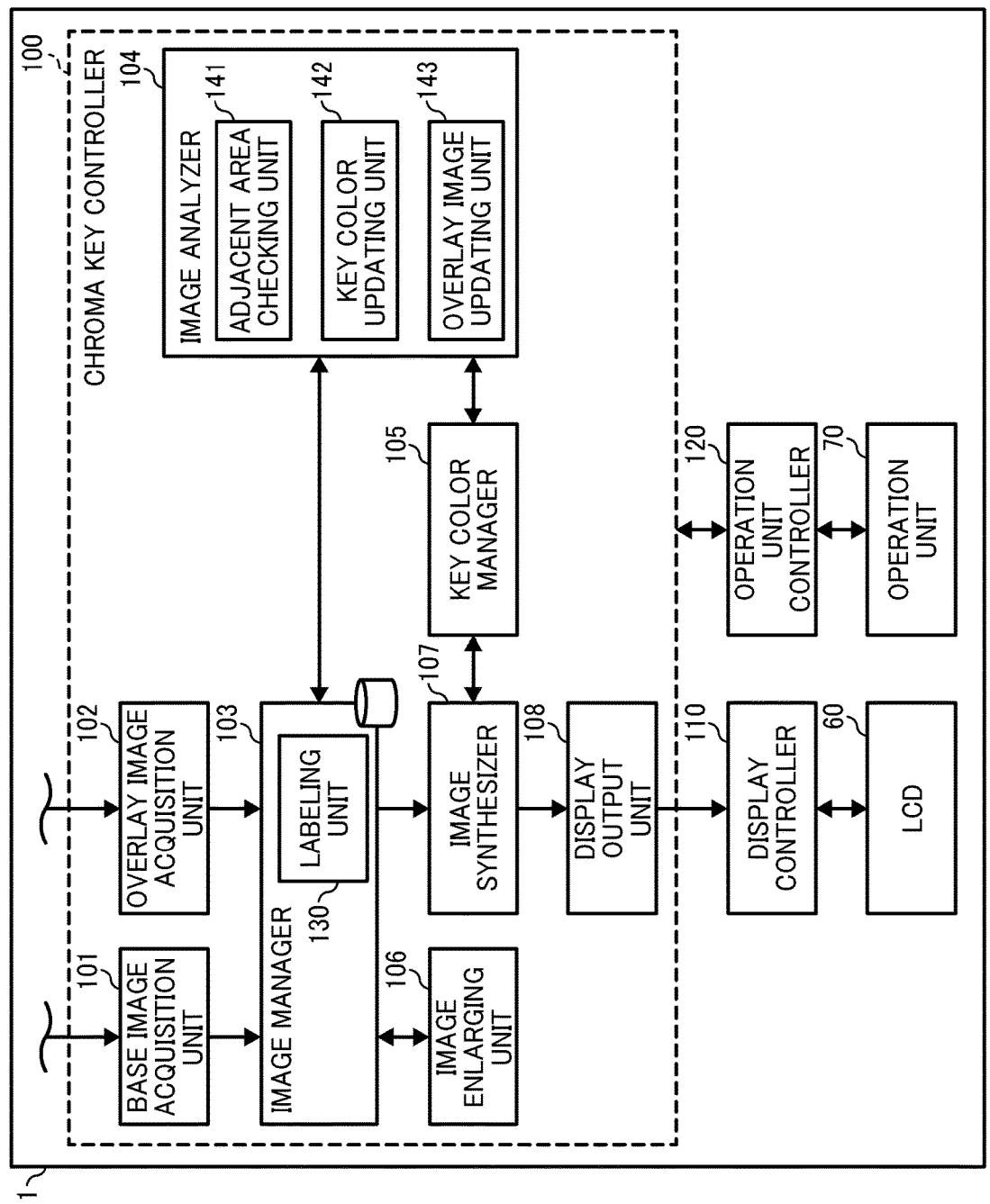
FIG. 2 is a functional configuration of the image processing apparatus of FIG. 1.

A description is given of a functional configuration of the image processing apparatus 1 of the first example embodiment with reference to FIG. 2. As illustrated in FIG. 2, the image processing apparatus 1 includes, for example, a chroma key controller 100, a display controller 110, an operation unit controller 120 in addition to the LCD 60 and the operation unit 70 described in FIG. 1.

The display controller 110 controls the LCD 60 to display information on the LCD 60. The operation unit controller 120 recognizes a user's operation to the operation unit 70, and transfers the user's operation to the chroma key controller 100. In the image processing apparatus 1, the chroma key controller 100 acquires a first image such as an "overlay image" and a second image such as a "base image," and performs the image processing such as chroma-key synthesis processing. A program for implementing the chroma key controller 100 is used as the image processing program.

As illustrated in FIG. 2, the chroma key controller 100 includes, for example, a base image acquisition unit 101, an overlay image acquisition unit 102, an image manager 103, an image analyzer 104, a key color manager 105, an image enlarging unit 106, an image synthesizer 107 and a display output unit 108. The base image acquisition unit 101 acquires a base image input to the chroma key controller 100. The base image can be any images such as movie image and still image. The overlay image acquisition unit 102 acquires an overlay image input to the chroma key controller 100. The overlay image can be various images such as icon images.

The base image and the overlay image can be input to the chroma key controller 100 by, for example, a user's operation to the operation unit 70. The base image and the overlay image can be, for example, image information acquired from a network, and image information stored in the HDD 40. Further, if a pre-set image is used as the overlay image, the overlay image may be stored in the storage medium such as the HDD 40, or the overlay image acquisition unit 102.

The image manager 103 manages the base image acquired by the base image acquisition unit 101, and the overlay image acquired by the overlay image acquisition unit 102, and performs an adjustment of the key color, and controls an enlargement process of the overlay image. Further, the image manager 103 includes, for example, a labeling unit 130, which performs a labeling process. The image analyzer 104 analyzes the image input by the image manager 103, and performs a process to change the key color.

As illustrated in FIG. 2, the image analyzer 104 includes, for example, an adjacent region checking unit 141, a key color updating unit 142 and an overlay image updating unit 143. The detail of the image analyzer 104 will be described later.

The key color manager 105 manages a pixel value designated as the key color in the chroma key controller 100. FIG. 3 is an example of information of the key color managed by the key color manager 105. As illustrated in FIG. 3, color information designated as the key color can be defined by a combination of values of red, green, and blue (RGB). The color information designated as the key color is used as transparency-process color information used for performing the transparency-process to a target image or region. The transparency-process color information designates a color value of a pixel to become a target of the transparency process. The transparency-process color information can be stored in a memory such as the ROM 30. The key color manager 105 manages the transparency-process color information stored in the memory.

The pixel value can be defined by, for example, 256 gradations correspond to 8-bit data. The chroma key controller 100 can designate any color as the key color by designating values of each of R, G and B within the 256 gradations. For example, a color value set as the default key color value for the chroma key controller 100 can be magenta composed of R: 255, G: 0, and B: 255, in which when an image is input as the overlay image, a transparency process region in the input overlay image to be processed by the transparency process has a pixel value corresponding to the magenta.

Under the control of the image manager 103, the image enlarging unit 106 performs the enlargement process for the overlay image based on an image size of the base image. The image enlargement process by the image enlarging unit 106 can use known algorisms. When an original image is enlarged as an enlarged image, the original pixels of the original image are arranged with a dispersed arrangement in the enlarged image, and thereby new pixels (hereinafter, gap pixels) are generated between the original pixels arranged with a dispersed pattern in the enlarged image. The pixel values of the gap pixels between the original pixels arranged with the dispersed pattern in the enlarged image can be calculated based on the pixel values of the original pixels.

Under the control of the image manager 103, the image synthesizer 107 performs the transparency process for the overlay image based on the key color information managed by the key color manager 105, and superimposes the transparency-processed overlay image on the base image to generate a synthesized image. The display output unit 108 outputs the image synthesized by the image synthesizer 107 to the LCD 60 to display the synthesized image on the LCD 60, in which the display output unit 108 can be used as an output unit.

(Chroma-Key Synthesis Processing)

A description is given of the chroma-key synthesis processing when an overlay image and a base image have the same image size, and the chroma-key synthesis processing when an overlay image and a base image have different image size and the chroma-key synthesis processing is performed after enlarging the overlay image. FIG. 4 illustrates an example case that the chroma-key synthesis processing is performed when the overlay image and the base image have the same image size, in which a first image 1011 used as the overlay image is superimposed and synthesized with a second image 1012 used as the base image to generate a synthesis image 1100. In FIG. 4, the first image 1011 has a transparency region 1013 having a pixel value matched to a designated key color, which is indicated by slanted lines in FIG. 4 and includes an object region 1013a used as a non-transparency region. After performing the transparency process to the transparency region 1013, the first image 1011 is superimposed on the second image 1012.

Further, FIG. 5 illustrates another example case that the chroma-key synthesis processing is performed when the overlay image and the base image have different image sizes, in which the first image 1011 used as the overlay image is enlarged. As illustrated in FIG. 5, an image size of the first image 1011 is smaller than an image size of the second image 1012. Therefore, the first image 1011, including object region 1013a used as a non-transparency region, is enlarged to the same size of the second image 1012 as an enlarged first image 1111, including enlarged object region 1013e used as a non-transparency region and then the chroma-key synthesis processing is performed to the enlarged first image 1111 similar to the chroma-key synthesis processing of FIG. 4. FIG. 5 illustrates a case that the entire overlay image is enlarged before the entire overlay image is superimposed on the base image.

Figures 6, 7A, 7B:
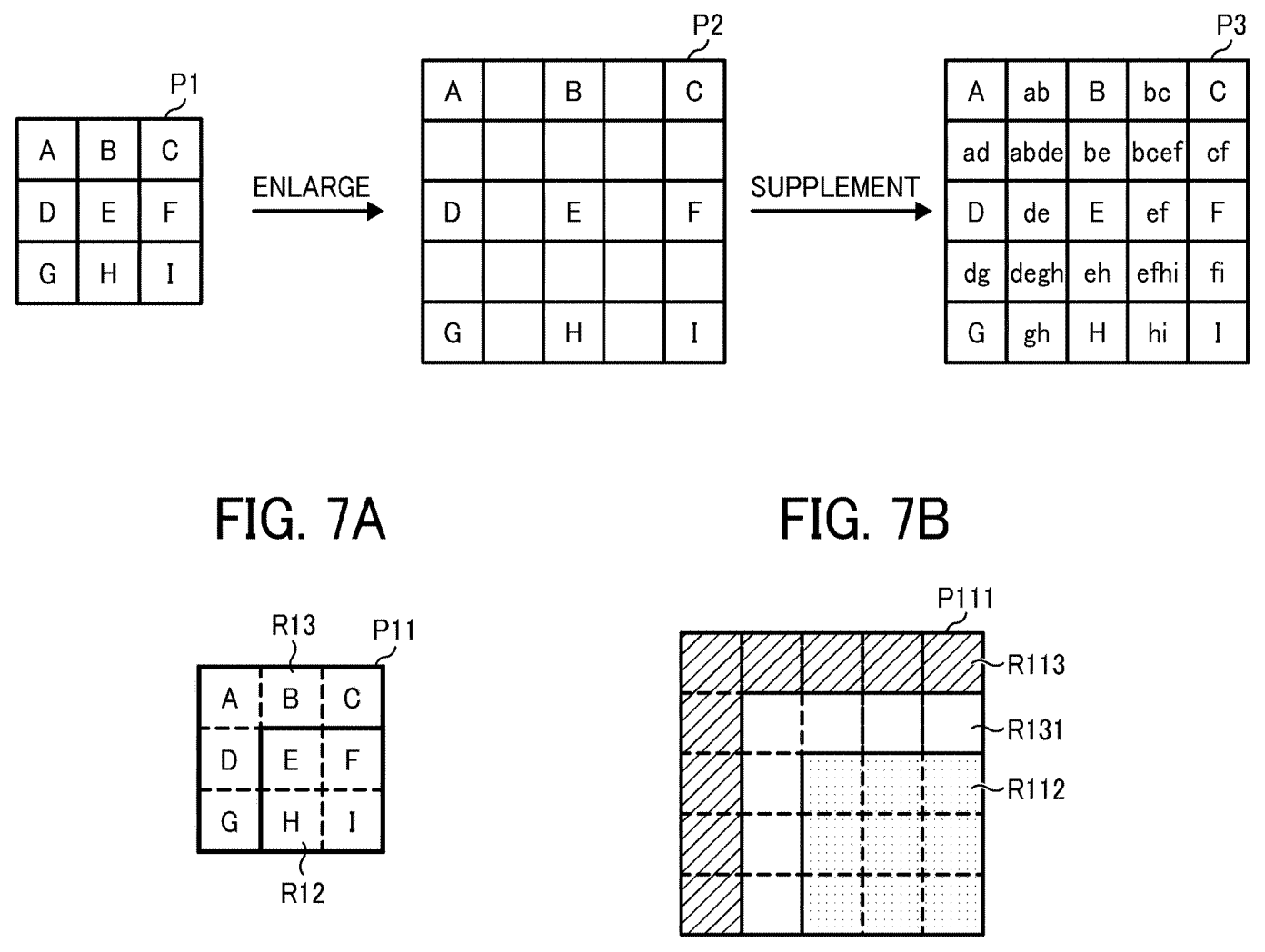

A description is given of a noise, with reference to FIGS. 6 and 7, which may occur when the chroma-key synthesis processing is performed using the enlarged first image 1111 illustrated in FIG. 5. FIG. 6 illustrates the enlargement process of an image. For the simplicity of description, an example case that an image having 3 pixels in the vertical and horizontal directions is enlarged to an image having 5 pixels in the vertical and horizontal directions is described in FIG. 6.

As illustrated in FIG. 6, it is assumed that a pre-enlargement image is set as an image P1 having 3 pixels in the vertical direction and 3 pixels in the horizontal direction, and thereby the image P1 is composed of 9 pixels each respectively having pixel values of A to I. In this example case, the image P1 is enlarged to an intermediate enlarged image P2, and then generated as a target enlarged image P3 having 5 pixels in the vertical direction and 5 pixels in the horizontal direction. When the image P1 is enlarged to the target enlarged image P3, at first, the image P1 is enlarged to the intermediate enlarged image P2 having 5 pixels in the vertical direction and 5 pixels in the horizontal direction, with which the enlarged image P2 has the total of 25 pixels. When the image P1 is enlarged to the intermediate enlarged image P2, the image enlarging unit 106 sets the pixel values A to I of the pixels of the image P1 to the enlarged image P2 by arranging the pixel values A to I evenly in line with the pixel arrangement in the image P1 as illustrated in FIG. 6. Therefore, some of pixels of the intermediate enlarged image P2 are set with the pixel values A to I while the remaining pixels of the intermediate enlarged image P2 are not set with pixel values as illustrated in FIG. 6. The remaining pixels of the intermediate enlarged image P2 may be referred to gap pixels.

After the image P1 is enlarged to the intermediate enlarged image P2, the target enlarged image P3 is generated from the intermediate enlarged image P2. Specifically, the gap pixels in the intermediate enlarged image P2 are supplemented by using the pixel values A to I of the pixels surrounding the gap pixels as illustrated in FIG. 6. For example, as illustrated in FIG. 6, a gap pixel between one pixel having the pixel value A and another pixel having the pixel value B is set with a pixel value "ab," which means the pixel value of gap pixel is calculated as the pixel value "ab" based on the pixel values A and B. Further, a gap pixel positioned at the center of the pixels having the pixel values A, B, D, and E is set with a pixel value "abde," which means the pixel value of gap pixel is calculated as the pixel value "abde" based on the pixel values A, B, D, and E.

FIG. 7 illustrates an occurrence of noise when the overlay image is enlarged by the above described enlargement process. As illustrated in FIG. 7A, before receiving the enlargement process, a pre-enlargement image P11 has a transparency-process region R13 and a non-transparency region R12. In a case of FIG. 7A, the transparency-process region R13 includes pixels having pixel values A, B, C, D, and G, and the pixel values A, B, C, D, and G match to a value designated as the key color. By contrast, the non-transparency region R12 includes pixels having pixel values E, F, H, and I. The pixel values E, F, H, and I does not match to the value designated as the key color.

When the enlargement process of FIG. 6 is performed for the pre-enlargement image P11 of FIG. 7A, the pre-enlargement image P11 becomes a post-enlargement image P111 as illustrated in FIG. 7B. After the enlargement, the post-enlargement image P111 has the transparency region R113 after the enlargement, the non-transparency region R112 after the enlargement, and also a noise region R131. In the post-enlargement image P111, the pixels of the transparency region R113 includes the pixels having pixel values A, B, C, D, and G initially designated as the key color in the transparency-process region R13 of the pre-enlargement image P11, and pixel values of other pixels are calculated by using the pixel values A, B, C, D, and G. Therefore, the pixels of the transparency region R113 have the pixel value designated as the key color, and the other pixels are supplemented by using the pixel value designated as the key color alone. Therefore, the transparency region R113 can be processed as the key color by the transparency process.

Further, in the post-enlargement image P111, the pixels of the non-transparency region R112 have the pixel values E, F, H, and I not matched to the value designated as the key color as indicated in the non-transparency region R12 of the pre-enlargement image P11, and pixel values of the other pixels are supplemented or calculated by using the pixel values E, F, H, and I. Therefore, the pixels of the non-transparency region R112 does not include the pixels having pixel value matched to the key color. Therefore, the non-transparency region R112 is not processed by the transparency process.

By contrast, the pixel value of the pixels composing the noise region R131 (FIG. 7B) are calculated by using the pixel value designated as the key color and the pixel value not designated as the key color. Therefore, the pixel value of the noise region R131 becomes different from the pixel value designated as the key color. Therefore, the noise region R131 is not processed by the transparency process in the chroma-key synthesis processing, and displayed as a noise region.

In this configuration, the color value of the noise region R131 is calculated based on the color value of the non-transparency region R112 and the color value of the transparency region R113 designated as the key color. Therefore, when the noise region R131 is displayed, the color value of the noise region R131 is displayed with a "color value" different from the color value of the non-transparency region R112. If the color value of the noise region R131 and the color value of the non-transparency region R112 are displayed differently, a user recognizes this difference as noise. In this situation, an edge noise occurs between the key color region and other region due to the enlargement of the overlay image. This edge noise can be reduced or prevented by performing the image processing to be described later in this description.

(Image Processing of First Example Embodiment)

A description is given of an image processing method of a first example embodiment. The image processing method of the first example embodiment is performed by the chroma key controller 100 as the chroma-key synthesis processing.

Figure 8:
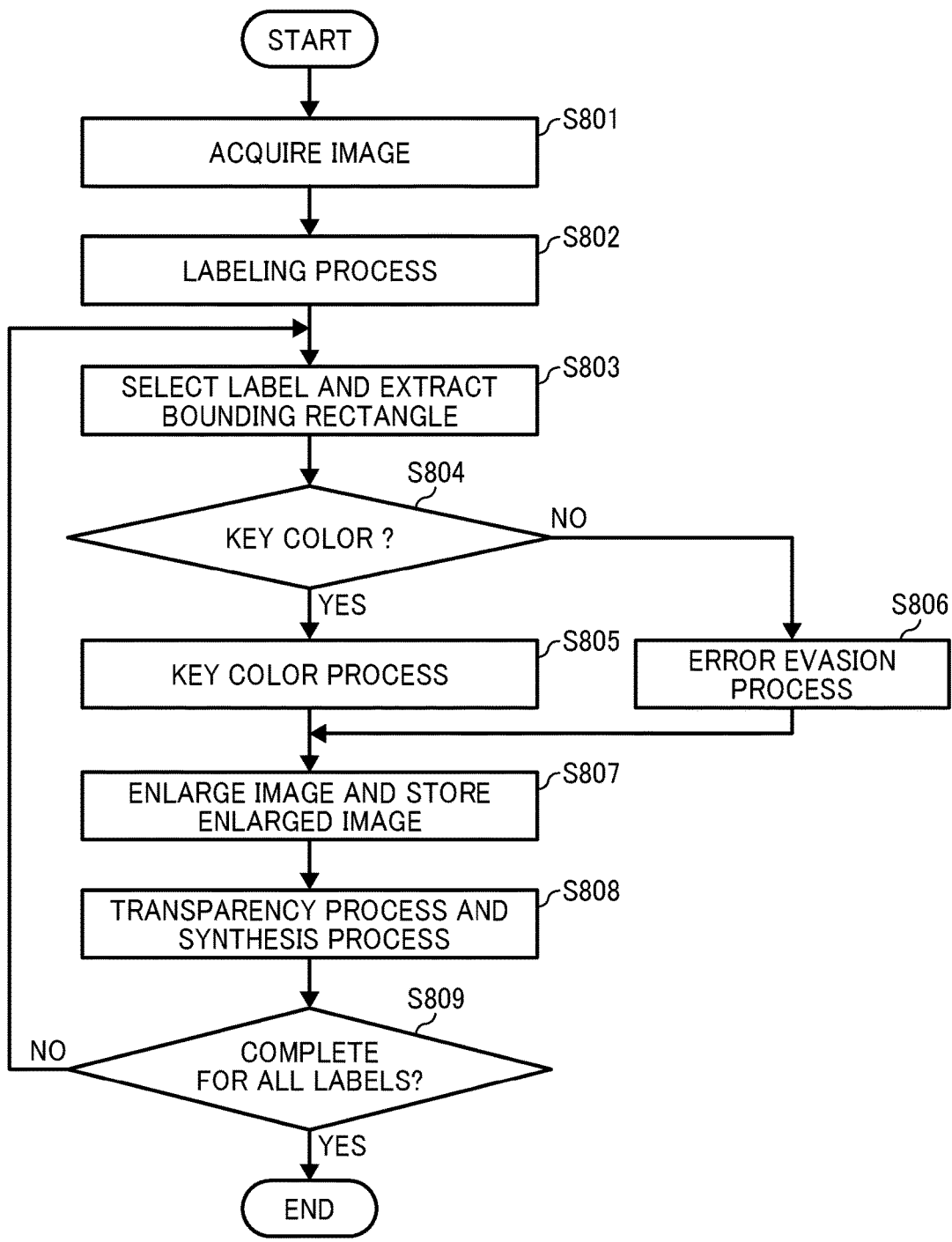
FIG. 8 is a flowchart showing the steps of an image processing of the first example embodiment.

FIG. 8 is a flowchart showing the steps of an image processing of the chroma key controller 100 of the first example embodiment. A description is given of the chroma-key synthesis processing with reference to FIG. 8. As illustrated in FIG. 8, at first, the base image acquisition unit 101 acquires a base image and the overlay image acquisition unit 102 acquires an overlay image (S801), and the base image and the overlay image can be stored in the image manager 103.

After acquiring the base image and the overlay image, the labeling unit 130 of the image manager 103 performs the labeling process to the overlay image (S802). The labeling process is performed to assign the same label to pixels included in the same object region displayed in the overlay image based on pixel values of pixels composing the overlay image, with which pixels having the substantially same color value and adjacently disposed with each other can be defined as one linked region. Therefore, the labeling unit 130 can be used as a link unit. Based on the labeling process, the object region included in the overlay image can be identified as the link region.

Figures 9, 10:
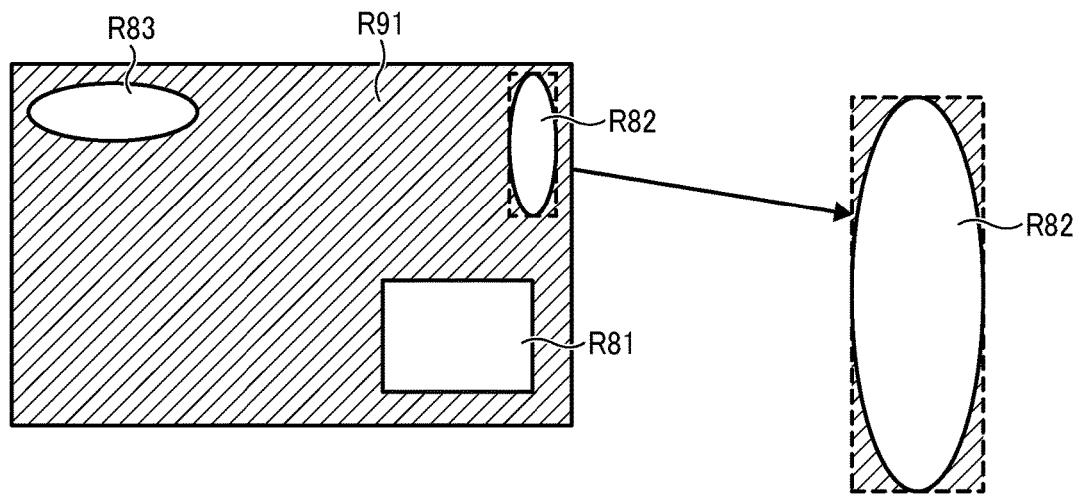
FIG. 9 illustrates an example result of a labeling process of an overlay image of the first example embodiment.
FIG. 10 illustrates an example of color information retained for an image analysis of the first example embodiment.

FIG. 9 illustrates an example result of the labeling process. The slanted line region in FIG. 9 is a transparency region R91 having a pixel value designated as the key color. By contrast, other regions such as a region R81, a region R82, and a region R83, which are different object regions, are respectively assigned with different specific labels. Each of the region R81, the region R82 and the region R83 linked by the labeling process can be processed as one linked region independently. Further, when the labeling process is performed at S802, the labeling process by the key color manager 105 can be omitted for the region having the pixel value designated as the key color to reduce the processing load of the key color manager 105.

After the labeling unit 130 performs the labeling process at S802, the image manager 103 selects the generated labels sequentially, and extracts a pixel region that surrounds the pixels assigned with the selected label as a bounding rectangle region or circumscribing rectangle region (S803), which is referred to an a process target region. FIG. 9 illustrates an example of extraction result that the bounding rectangle region bounding the region R82 is extracted as the process target region. The image manager 103 inputs the extracted process target region (e.g., rectangle region) to the image analyzer 104, and requests the image analyzer 104 to activate the key color process.

After receiving the request of the key color process, the image analyzer 104 sequentially checks the pixel values of the pixels composing the input process target region (e.g., rectangle region) to determine whether pixels having the pixel value matched to the key color managed by the key color manager 105 exist in the input process target region (S804). At S804, the image analyzer 104 checks the pixel values (e.g., each value of RGB) of each of the pixels composing the process target region, and stores a maximum value and a minimum value for each of RGB as illustrated in FIG. 10. If a pixel value of a newly checked pixel is greater than the already stored maximum value, or if a pixel value of a newly checked pixel is smaller than the already stored minimum value, the initially-set pixel value is updated by the pixel value of the newly checked pixel.

If the image analyzer 104 determines that one or more pixels having the pixel value matched to the designated key color exist in the process target region (e.g., rectangle region) (S804: YES), the image analyzer 104 performs the key color process (S805). At S805, the image analyzer 104 changes or updates the value designated as the key color (see FIG. 3) and managed by the key color manager 105. Further, among the pixels included in the process target region (e.g., rectangle region), the image analyzer 104 changes the pixel value of the pixels designated with the initial key color value to the updated key color, which means that the image analyzer 104 applies the updated key color value to the pixels of the key color region existing in the process target region. The process at S805 will be described later in detail.

By contrast, if the image analyzer 104 determines that a pixel having the pixel value matched to the designated key color is not extracted from the rectangle region even if all of the pixels of the process target region (e.g., rectangle region) are analyzed (S804: NO), the image analyzer 104 performs an error evasion process (S806). Even if a pre-enlargement image does not include the pixel value matched to the key color, a pixel value generated by the above described supplement process described with reference to FIG. 6 may become the key color accidentally when the image is enlarged, and then the pixel accidentally having the pixel value of the key color is processed by the transparency process, and thereby the transparency process result becomes an error. The error evasion process at S806 can prevent this accidental error.

Therefore, at S806, the image analyzer 104 changes or updates the value of the key color managed by the key color manager 105 to a value greater than the stored maximum value of each of RGB or a value smaller than the stored minimum value of each of RGB (see FIG. 10) as a new key color (i.e., third color value). By re-setting the key color, a pixel value that cannot be generated by the above described enlargement and supplement process (see FIG. 6) can be designated as the key color. Further, the error evasion process using the information of FIG. 10 is just one example, and not limited hereto. For example, a value such as R: 255, G: 255, and B: 255 that cannot be generated by the above described supplement process can be designated as the key color. Therefore, at S806, the image analyzer 104 can be used as an error evasion unit.

After completing S805 or S806, the image manager 103 inputs the process target region (e.g., rectangle region) processed by the image analyzer 104 to the image enlarging unit 106 to perform the enlargement process, and stores an enlarged image of the process target region obtained by the enlargement process (S807). Further, in addition to the enlargement of the input process target region, the image enlarging unit 106 acquires a position of the process target region on the overlay image to calculate a position of the process target region on the post-enlargement image (i.e., enlarged process target region image).

The image manager 103 inputs the enlarged process target region image and the position of the enlarged process target region image obtained by the above described processing to the image synthesizer 107 with the base image. Then, the image synthesizer 107 performs the transparency process to the input enlarged process target region image based on the color information designated as the key color and managed by the key color manager 105. Further, the image synthesizer 107 superimposes and synthesizes the enlarged process target region image on the base image based on the input information of the position of the enlarged process target region image (S808). Therefore, the image synthesizer 107 can be used as a transparency processing unit.

The image manager 103 repeats steps S803 to S808 for all of the labels generated at S802 until all of the labels are processed (S809: NO). When all of the labels are processed completely (S809: YES), the sequence is completed, in which the sequence is performed for all of the linked regions defined by the labeling process.

Figure 11:
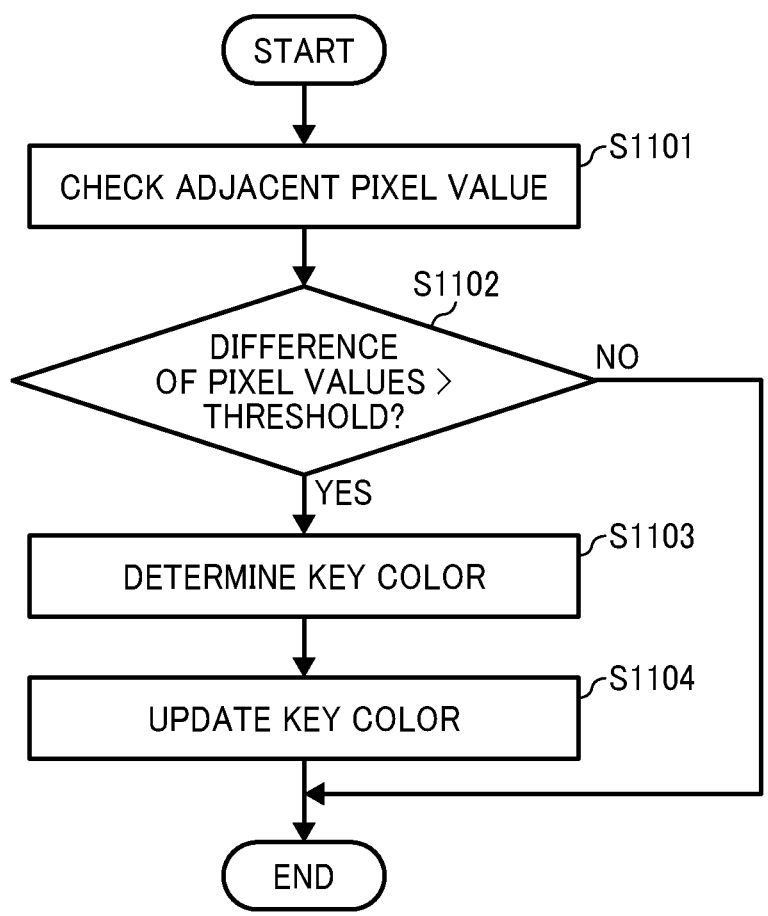
FIG. 11 is a flowchart showing the steps of a process of a key color process of the first example embodiment.

A description is given of a detail of the key color process at S805 of FIG. 8 with reference to FIG. 11. As illustrated in FIG. 11, in the image analyzer 104, the adjacent region checking unit 141 checks the pixel values of pixels in the process target region (e.g., rectangle region), which is an analysis target. Specifically, the adjacent region checking unit 141 checks the pixel values of pixels adjacent to the key color region (S1101). At S1101, the object region (i.e., non-transparency process region) adjacent to the key color pixel is checked, in which the object region may be referred to the adjacent region, and the key color region may be referred to a transparency-process region. Since the process target region image is a labeled image as above described, the pixel values of pixels of the process target region image that are checked at S1101 may not match the key color.

After the adjacent region checking unit 141 checks the pixel value of the pixels of the object region (i.e., adjacent region), the key color updating unit 142 calculates the difference of the checked pixel value and the pixel value designated as the key color for each of R, G, B, and determines whether a calculation result exceeds a given threshold (S1102). At S1102, a specific threshold can be set for each of RGB to determine the difference of pixel values of the pixels, or a specific threshold can be set for a total or an average of the difference of each of RGB to determine the difference of pixel values of the pixels.

If the difference of pixel values is less than the given threshold (S1102: NO), the key color updating unit 142 does not change the value designated as the key color, and ends the process. By contrast, if the difference of pixel values exceeds the given threshold (S1102: YES), the key color updating unit 142 changes or updates the key color based on the pixel value checked at S1101 (S1103), in which the key color updating unit 142 can be used as an transparency-process color information updating unit. Step S1102 is performed to check a level of a color distance between the pixel value of the object region, adjacent to the key color region, and the pixel value of the key color region.

At S1103, the image analyzer 104 determines a value of the key color based on the value of each of RGB of the adjacent pixel checked at S1101. For example, if the value of each of RGB of the adjacent pixel checked at S1101 is R: 23, G: 135, B: 56, the image analyzer 104 adds "1" to each of RGB, and determines the value of R: 24, G: 136, B: 57 as a new key color, and stores the new key color in the key color manager 105.

Then, among the pixels composing the process target region image (i.e., analysis target), the overlay image updating unit 143 changes or updates the pixel value of the pixels having the initial key color value (i.e., first color value) to the new key color value (i.e., second color value) (S1104), which means that the overlay image updating unit 143 applies the new key color value to the pixels of the key color region existing in the process target region image, in which the overlay image updating unit 143 can be used as a transparency-process region updating unit. Then, the key color process is completed.

Step S1103 is performed to set the transparency process color information with a color value similar to the color value of the adjacent region and different from the color value of the adjacent region. Therefore, as above described, "1" gradation can be added to each one of RGB, or "1" gradation can be added to any one or two of RGB of the color of the adjacent region. Further, the adding value is not limited to "1" but other values can be used as long as the color value of the key color region becomes similar to the color value of the adjacent region.

A description is given of an effect of processes of S807 and S808 of FIG. 8 after performing the above described key color process with reference to FIG. 12. Similar to FIG. 7, FIGS. 12A and 12B respectively illustrate a region of an overlay image P11 before enlargement and a region of an overlay image P120 after the enlargement of the overlay image. FIG. 12A illustrates a transparency region R13 and an overlay image region R12 before the enlargement. As illustrated in FIG. 12B, a noise region R123 occurs between an enlarged transparency region R122 and an enlarged overlay image region R121 similar to FIG. 7.

The enlarged overlay image region R121 in FIG. 12B corresponds to the adjacent pixel region checked at S1101 of FIG. 11. Therefore, the pixel value of the noise region R123 can be calculated based on a pixel value of the overlay image region R121, and the key color that is converted to the color similar to the pixel value of the overlay image region R121. In this case, when the color value of the pixel value of the noise region R123 and the color value of the overlay image region R121 are compared, the difference of the color values region noise region R123 and the overlay image region R121 may not be detected by human eyes. Therefore, a user can view the noise region R123 as a part of the overlay image region R121, and may not view the noise region R123 as a noise.

The above described key color process is performed for each of the labels assigned to each of the object regions of FIG. 9 to set the key color matched to the color value of each of the object regions, and then S807 and S808 are performed. Therefore, even if a plurality of object regions having different color values are included in the overlay image, the enlargement process and the chroma-key synthesis processing of the overlay image can be performed without causing an edge noise at each of the object regions.

As to the above described image processing apparatus 1, when the overlay image is enlarged and superimposed on the base image, the chroma-key synthesis processing is performed, in which the pixel value of pixel adjacent to the pixel designated as the key color in the overlay image is checked. Then, the key color is changed to a color different from the checked pixel value and similar to the checked pixel value if required.

Therefore, even if the process target region image of the overlay image is enlarged, at a boundary region adjacently between the key color region (i.e., transparency process region) and the object region (i.e., non-transparency process region) generated by the enlargement process, the color value of the pixels at the boundary region generated by the supplement process becomes a color value different from the key color region and similar to the color value of the object region. Therefore, even if the overlay image having received the enlargement process is superimposed on the base image by the chroma-key synthesis processing, the occurrence of the edge noise having a color value significantly different from the color value of the object region at the boundary of the object region (i.e., non-transparency process region) and the key color region (i.e., transparency process region) can be prevented.

As to the above described image processing apparatus 1, as illustrated in S1102 of FIG. 11, if the difference of the pixel value designated as the key color and the pixel value of the adjacent region exceeds the given threshold, the above described changing or updating of the key color is performed. Therefore, if the noise level is not recognizable by human eyes, the above described changing or updating of the key color can be omitted, with which the processing load can be reduced. However, this is just one example. For example, it can be configured to perform steps S1103 and S1104 without performing S1102.

Further, as to the above described image processing apparatus 1, as illustrated in FIG. 9, it can be assumed that the overlay image includes a plurality of object regions, in which after the labeling is performed, the above described processing is performed for each of the labels, but not limited hereto. For example, if only one label is extracted at S802, step S803 can be omitted, and steps S804 and subsequent steps can be performed by assuming the entire region of the overlay image as the rectangle region.

Further, even if the only one label is extracted at S802, the above described processing can be performed to the bounding rectangle surrounding the labeled region. With employing this configuration, the number of target pixels to be determined whether the pixels has the key color or not at S804 can be reduced, and the number of target pixels to change the pixel value at S1104 can be reduced, with which the processing can be simplified.

Further, as to the above described image processing apparatus 1, as illustrated in FIG. 3, the key color is set as one single color by designating one single value for each of RGB, but not limited hereto. For example, as illustrated in FIG. 13, the pixel value for each of RGB can be set with as a pixel value rage defined by the upper value and the lower value. In this case, the difference of pixel values can be determined at S1102 as follows. When the pixel value of the adjacent region is greater than the upper value, the difference of the pixel value of the adjacent region and the upper value is used as the difference of pixel values, and when the pixel value of the adjacent region is smaller than the lower value, the difference of the pixel value of the adjacent region and the lower value is used as the difference of pixel values.

Further, the threshold used for the comparison at S1102 is set with a smaller value to reduce the edge noise occurrence, and the most restrictive value is "1" gradation in the above described processing. By contrast, if the difference of pixel values does not cause a significant level of the edge noise, the key color may not be required to be changed, in which the key color process can be omitted and the processing load can be reduced. In this case, the threshold can be set to a greater value that allows some level of the difference of pixel values.

The threshold can be set, for example, by a user's operation to the operation unit 70 (i.e., manual operation), and the threshold can be changed automatically depending on the types of overlay image. FIG. 14 is an example of a threshold table retained by the image analyzer 104. The threshold table includes various thresholds that can be changed depending on the types of overlay image.

As illustrated in FIG. 14, the "types of overlay image" and "threshold" are correlated in the threshold table. The image analyzer 104 can acquire the thresholds correlated to the types of overlay images acquired by the overlay image acquisition unit 102, and applies the thresholds at S1102. With employing this configuration, the threshold used at S1102 can be changed depending on the types of overlay image.

Further, as to the above described image processing apparatus 1, the processing of FIG. 8 and FIG. 11 are performed when the overlay image is input to the image processing apparatus 1. However, the processing of FIG. 8 and FIG. 11 are required when the overlay image is enlarged as above described. Therefore, it can be configured that the above described processing is performed when the image size of the overlay image is smaller than the image size of the base image.

(Functional Configuration of Second Example Embodiment)

Figure 15:
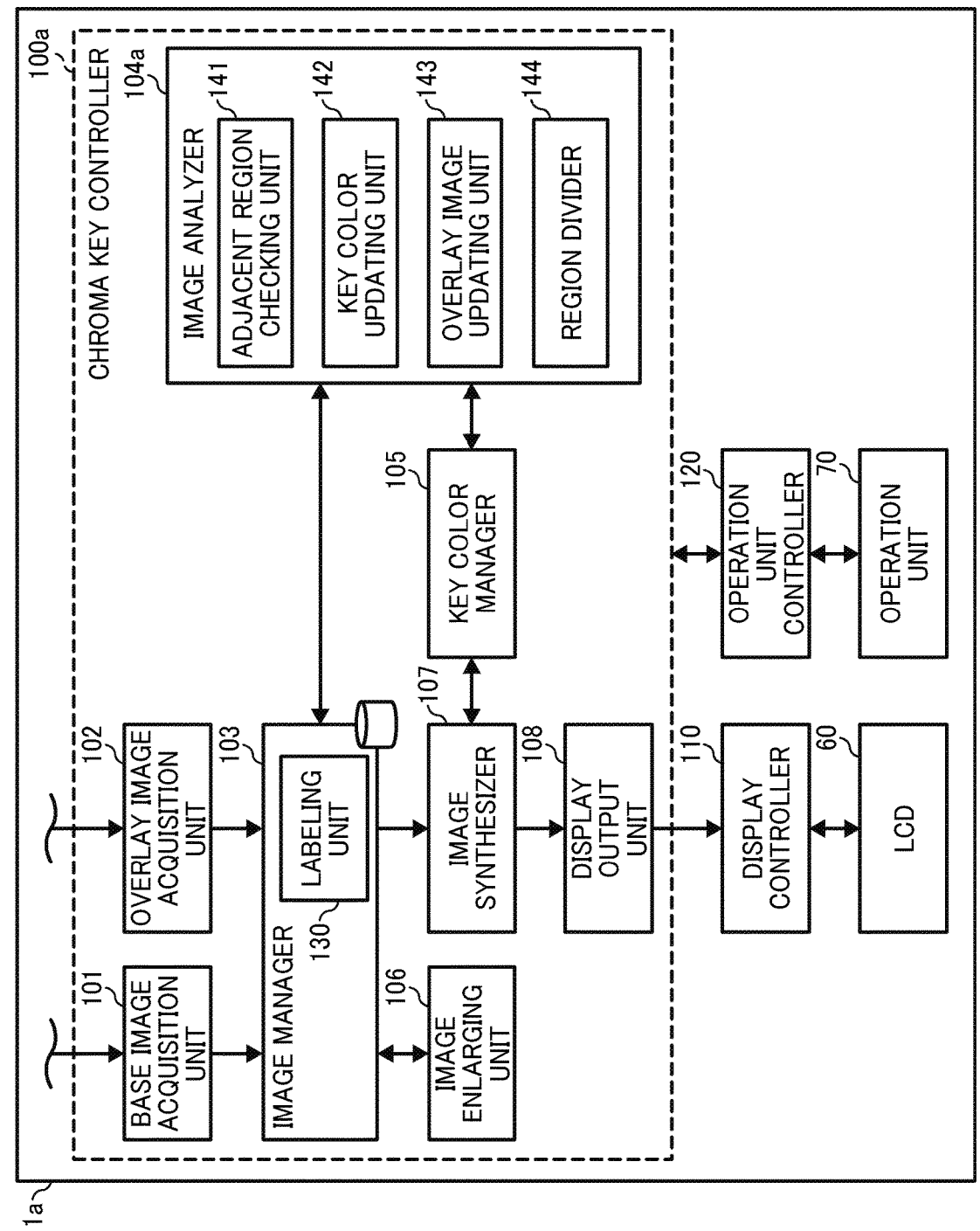
FIG. 15 is a functional configuration of an image processing apparatus of a second example embodiment.

A description is given of an image processing apparatus 1a of a second example embodiment with reference to FIG. 15. FIG. 15 is a functional configuration of the image processing apparatus 1a. The hardware configuration of the image processing apparatus 1a is same as the hardware configuration of the image processing apparatus 1 of FIG. 1. The image processing apparatus 1a is an information processing apparatus such as a personal computer (PC) to perform a specific image processing. The image processing apparatus 1a can perform the chroma-key synthesis processing effectively even if an overlay image includes non-transparency object regions overlapped with each other, and noise, which may occur due to an enlargement process of the overlay image, can be reduced, and in particular prevented.

As illustrated in FIG. 15, the image processing apparatus 1a includes, for example, the LCD 60, the operation unit 70 (FIG. 1), a chroma key controller 100a, the display controller 110 and the operation unit controller 120. The chroma key controller 100a includes, for example, the base image acquisition unit 101, the overlay image acquisition unit 102, the image manager 103, an image analyzer 104a, the key color manager 105, the image enlarging unit 106, the image synthesizer 107, and the display output unit 108.

The image manager 103 manages the base image acquired by the base image acquisition unit 101, and the overlay image acquired by the overlay image acquisition unit 102, and performs an adjustment of the key color, and controls the enlargement process of the overlay image. Further, the image manager 103 includes, for example, the labeling unit 130, which performs a labeling process.

The image analyzer 104a analyzes an image input by the image manager 103 to perform a dividing of a region linked by the labeling process, and a change of the key color. As illustrated in FIG. 15, the image analyzer 104a includes, for example, the adjacent region checking unit 141, the key color updating unit 142, the overlay image updating unit 143 and a region divider 144. The detail of the image analyzer 104a will be described later.

(Image Processing of Second Example Embodiment)

A description is given of the image processing method performable by the image processing apparatus 1a of the second example embodiment. The image processing method performable by the chroma key controller 100a is the chroma-key synthesis processing, which is already described.

Figure 16:
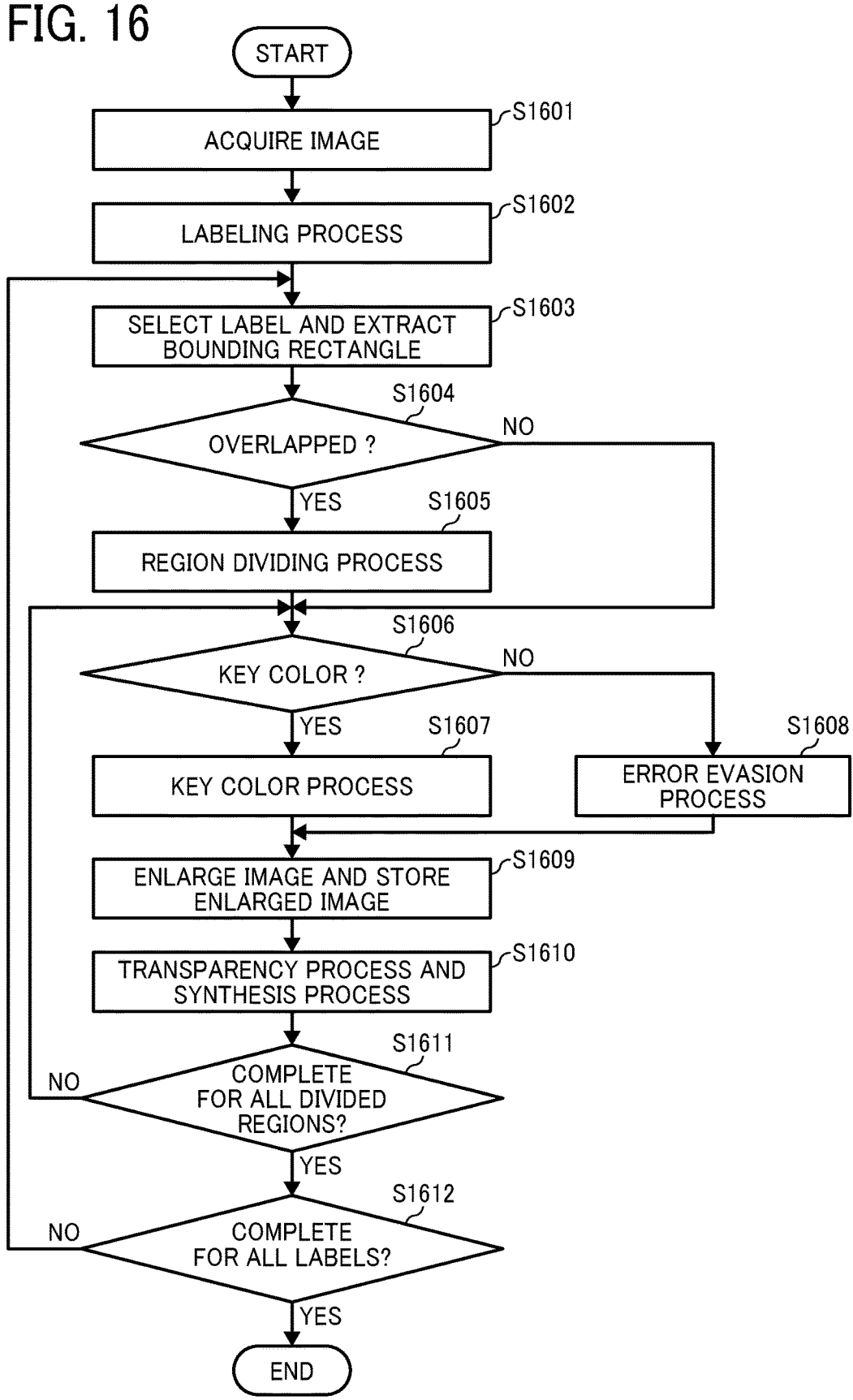
FIG. 16 is a flowchart showing the steps of an image processing of the second example embodiment

FIG. 16 is a flowchart showing the steps of a process of image processing of the chroma key controller 100a. A description is given of the steps of the image processing of the chroma-key synthesis processing with reference to FIG. 16. The steps same or similar to the first example embodiment of FIG. 8 may not be described in detail.

At first, the base image acquisition unit 101 acquires a base image and the overlay image acquisition unit 102 acquires an overlay image (S1601), and the labeling unit 130 of the image manager 103 performs the labeling process to the overlay image (S1602).

Figure 17:
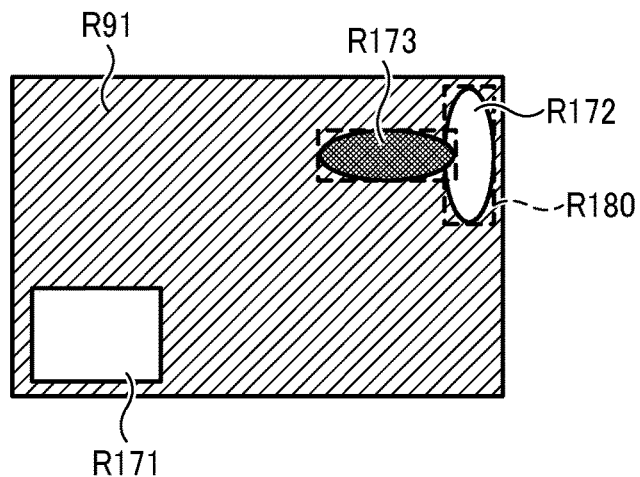
FIG. 17 illustrates an example result of a labeling process of an overlay image of the second example embodiment.

FIG. 17 illustrates an example result of the labeling process. The slanted line region in FIG. 17 is a transparency region R91 having a pixel value designated as the key color. By contrast, the region without the slanted line is a non-transparency region having a pixel value different from the pixel value designated as the key color. In an example case of FIG. 17, the non-transparency region includes three regions such as a region R171, a region R172 and a region R173. The region R171, the region R172, and the region R173, which are different object regions, are respectively assigned with different specific labels. Each of the region R171, the region R172, the region R173 linked by the labeling process can be processed as the linked region independently.

Figure 18:
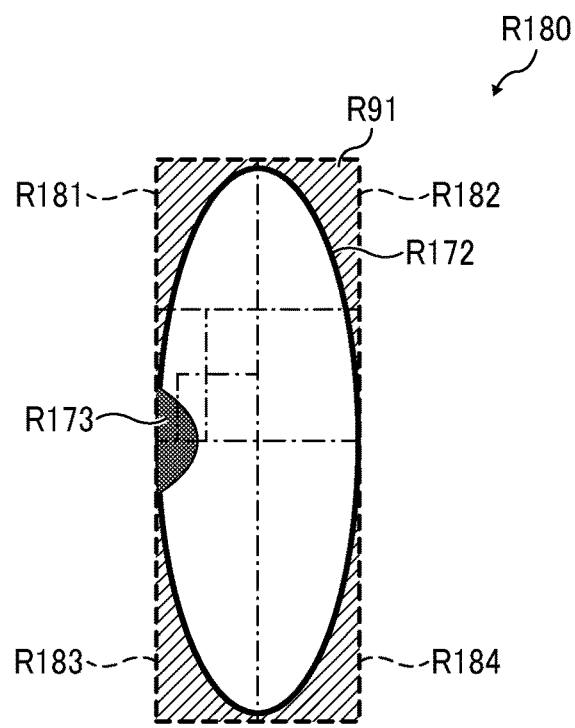
FIG. 18 illustrates an example of extraction result that a bounding rectangle region bounding an object region of the second example embodiment.

After the labeling unit 130 performs the labeling process at S1602, the image manager 103 selects the generated labels sequentially, and extracts a pixel region that surrounds the pixels assigned with the selected label as a bounding rectangle region or circumscribing rectangle region (S1603), which is referred to a process target region. FIG. 18 illustrates an example of extraction result that the bounding rectangle region bounding the region R172 is extracted as the process target region. In most of the cases, it can be assumed that the extracted linked region includes a single object region alone. However, in some cases, the extracted linked region includes a plurality of regions, in which one object region overlaps with another object region. For example, as indicated in FIG. 18, one object region such as the region R172 overlaps another object region such as the region R173. In this case the region R172 is divided into two or more regions as indicated by the dot line in FIG. 18 to be described later in detail.

Then, the image manager 103 inputs the extracted process target region (i.e., rectangle region) to the image analyzer 104a, and requests the image analyzer 104a to perform the overlapping determination process to the extracted process target region (i.e., rectangle region). After receiving the request of the overlapping determination process, the image analyzer 104a checks values of each of RGB in each of the pixels composing the region R172 (i.e., process target region), and compares the checked pixel values and the pixel values of each of RGB of the key color, which is managed as indicated in FIG. 3.

If it is determined that only one set of RGB different from the RGB used as the key color exists in the process target region based on the comparison (S1604: NO), the region dividing process (S1605) is not performed, and the image manager 103 inputs the extracted process target region (i.e., rectangle region) to the image analyzer 104, and requests the image analyzer 104a to perform the above described key color process.

By contrast, if it is determined that two or more sets of RGB different from the RGB used as the key color exist in the process target region based on the comparison (S1604: YES), the image analyzer 104a requests the region divider 144 to perform the region dividing process.

Figure 19:
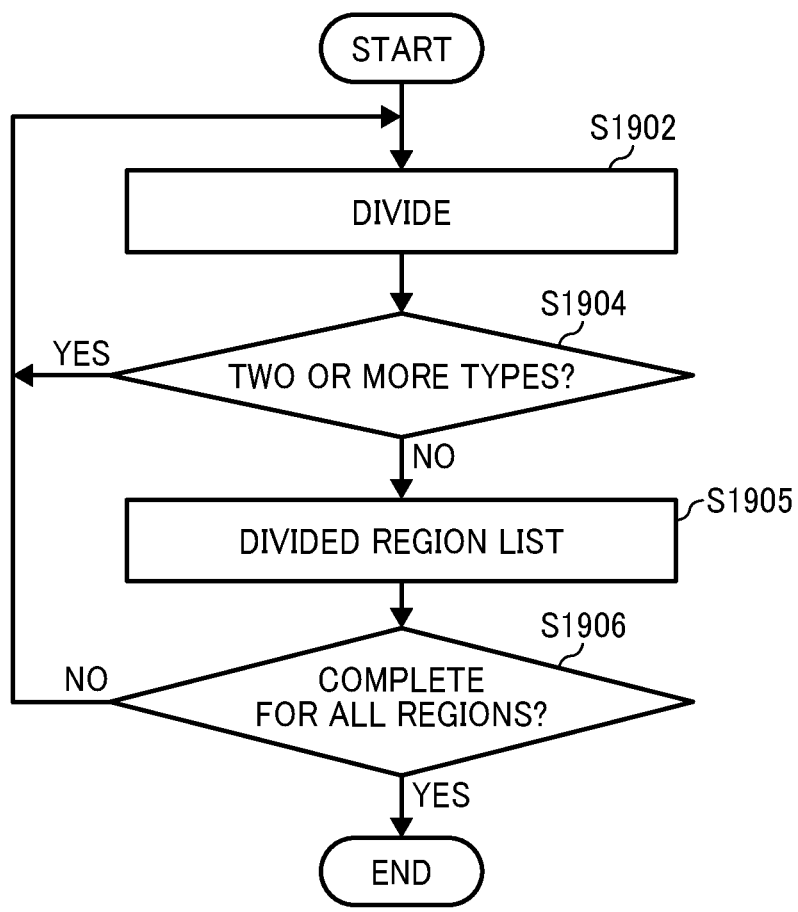

A description is given of a detail of the region dividing process at S1605 of FIG. 16 with reference to FIG. 19. As illustrated in FIG. 19, in the image analyzer 104a, the region divider 144 checks the size of the process target region (i.e., rectangle region) and divides the process target region based on the checked size of the process target region (S1902). For example, at step S1902, at first, the region divider 144 divides the process target region into a plurality of regions such as two regions or four regions depending on the size of the process target region as indicated in FIG. 18, in which the process target region R180 is divided into, for example, four regions of R181, R182, R183, and R184 as indicated by dot lines in the process target region R180.

Then, the pixel values of each of pixels and the pixel value designated as the key color existing in the one divided region (e.g., R181, R182, R183, and R184) are compared at step S1904. If it is determined that two or more types of the pixel value different from the pixel value designated as the key color exist in the one divided region (e.g., R181, R182, R183, R184) based on the comparison (S1904: YES), a further dividing process is required, and the sequence returns to S1902. Then, the divided region is further divided into two or more sub-regions, and step S1904 is performed to each of the sub-regions. In this description, the divided regions may mean the regions divided at step S1902 for the first time (e.g., R181, R182, R183, R184 in FIG. 18), and the regions divided at step S1902 for the second time, the third time and so on. For distinguishing the regions divided at step S1902 for the first time, and the regions divided at step S1902 for the second time, the third time and so on, the regions divided at step S1902 for the second time, the third time and so on may be referred to the sub-regions. Each of the divided regions and sub-regions can be used as a discrete region in the region dividing process.

By contrast, if it is determined that only one type of the pixel value different from the pixel value of the key color exists in the one divided region (e.g., R181, R182, R183, R184) or the one sub-region based on the comparison (S1904: NO), the determined one divided region or the one sub-region is stored in a divided region list (S1905) so that the one divided region or the one sub-region can be processed by the key color process (S1606 of FIG. 16) later. Steps S1902 and S1904 are performed repeatedly until the result of step S1904 becomes "NO" indicating that only one type of the pixel value different from the pixel value of the key color exists in the one sub-region.

Then, it is determined whether the above described steps are performed for all of the divided regions (e.g., R181, R182, R183, R184) prepared at step S1902 for the first time. If all of the divided regions (e.g., R181, R182, R183, R184) are not yet processed (S1906: NO), the region divider 144 returns the sequence to S1901. By contrast, if all of the divided regions (e.g., R181, R182, R183, R184) are processed completely (S1906: YES), the region dividing process is completed. Therefore, the region divider 144 can be used as a dividing processing unit.

After completing the region dividing processing, the image manager 103 inputs the divided region extracted from the divided region list to the image analyzer 104, and requests the image analyzer 104a to perform the key color process. The information of regions stored in the divided region list are used as the divided regions.

After receiving the request of the key color process, the image analyzer 104a checks the pixel value of each of the pixels composing the input divided regions sequentially, and the key color manager 105 checks whether a pixel having a pixel value matched to the pixel value designated as the key color exists in the divided region (S1606) similar to S804.

At S1606, the image analyzer 104a checks the pixel values (e.g., each value of RGB) of each of the pixels in the divided region, which is the process target region, and stores the maximum value and the minimum value set for RGB as illustrated in FIG. 10. If a pixel value of a newly checked pixel is greater than the already stored maximum value, or if a pixel value of a newly checked pixel is smaller than the already stored minimum value, the pixel value is updated by the pixel value of the newly checked pixel.

If the image analyzer 104 determines that one or more pixels having the pixel value matched to the designated key color exist in the divided region (S1606: YES), the image analyzer 104a performs the key color process (S1607). At S1607, the image analyzer 104a updates the value designated as the key color (see FIG. 3) and managed by the key color manager 105. Further, among the pixels included in the process target region (e.g., divided region), the image analyzer 104a changes the pixel value of the pixels designated with the initial key color value to the updated key color value, which means that the image analyzer 104a applies the updated key color value to the pixels of the key color region existing in the divided region. The process at S607 is same as the process of S805, and thereby the detail is omitted.

By contrast, if the image analyzer 104 determines that a pixel having the pixel value matched to the designated key color is not extracted even if all of the pixels of the process target region (e.g., divided region) are analyzed (S1606: NO), the image analyzer 104a performs the error evasion process (S1608). The error evasion process at S1608 is same as the error evasion process at S806.

After completing S1607 or S1608, the image manager 103 inputs the process target region (e.g., divided region) image processed by the image analyzer 104a to the image enlarging unit 106 to perform the enlargement process, and stores an enlarged image of the process target region obtained by the enlargement process (S1609). The process at S1609 is same as the process at S807.

The image manager 103 inputs the enlarged process target region (e.g., divided region) image and the position of the enlarged process target region image obtained by the above described processing to the image synthesizer 107 with the base image. Then, the image synthesizer 107 performs the transparency process to the input enlarged process target region (e.g., divided region) based on the color information designated as the key color managed by the key color manager 105. Further, the image synthesizer 107 superimposes and synthesizes the enlarged process target region on the base image based on the input information of the position of the enlarged process target region (S1610). The process at S1610 is same as the process at S808.

The image manager 103 repeats steps S1606 to S1611 for all of the divided regions generated at S1605 until all of the divided regions are processed (S1611: NO). When all of the divided regions are processed completely (S1611: YES), the image manager 103 determines whether all of the labels generated at S1602 are processed completely (S1612). If the process is not completed for all of the labels, the image manager 103 repeats steps S1603 to step S16011 (S1612: NO). If the process is completed for all of the labels, the sequence is completed (S1612: YES). Therefore, the sequence is performed for all of the linked regions defined by the labeling process. Further, if the linked regions overlap with each other, the sequence is performed for each one of the divided regions.

Figure 20:
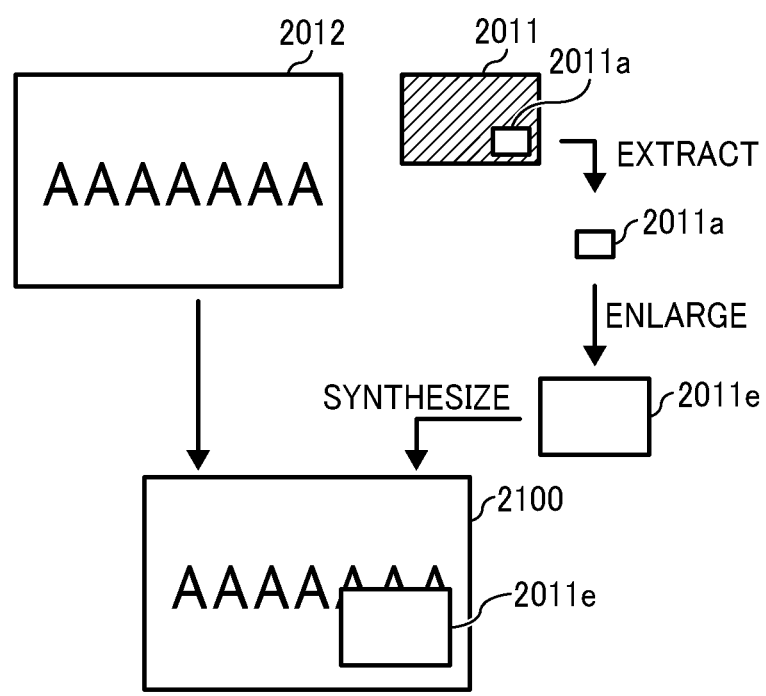
FIG. 20 illustrates an example case that a chroma-key synthesis processing of the first example embodiment is performed when an overlay image and a base image have different image sizes.

The imaging process of the above described example embodiments can be performed as indicated in FIG. 20. FIG. 20 schematically illustrates the above described imaging process, in which a first image 2011 used as the overlay image includes an object region 2011a used as the non-transparency region, which is the adjacent region adjacent to the key color region. As illustrated in FIG. 20, the object region 2011a is extracted from the first image 2011 and then enlarged in view of the size of the second image 2012 as an enlarged object region 2011e, and then the chroma-key synthesis processing is performed to the enlarged object region 2011e and the processed enlarged object region 2011e is superimposed on the second image 2012 to form a synthesis image 2100, in which the object region 2011a that is a part of the first image 2011 is extracted and then receives the imaging process of the above described example embodiments.

As to the above described example embodiments, when an overlay image is enlarged and superimposed on the base image, the occurrence of noise at the periphery of the non-transparency process region can be reduced, and in particular prevented.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image processing apparatus for synthesizing a first image including a transparency-process region and a non-transparency region, and a second image, the image processing apparatus comprising:

a memory to store a first color value as transparency-process color information useable for performing a transparency-process to the transparency-process region of the first image; and circuitry: to extract the non-transparency region and a part of the transparency-process region adjacent with each other and existing in the first image as a process target region;

to compare a color value of the non-transparency region and the first color value of the transparency-process region adjacent with each other and existing in the process target region;

to change the transparency-process color information from the first color value to a second color value depending on a comparison result of the color value of the non-transparency region and the first color value of the transparency-process region adjacent with each other and existing in the process target region, the second color value set closer to the color value of the non-transparency region;

to apply the second color value to the transparency-process region existing in the process target region;

to enlarge an image size of the process target region having the transparency-process region applied with the second color value in view of an image size of the second image;

to perform the transparency process to the enlarged process target region based on the second color value; and to superimpose the enlarged process target region having received the transparency process on the second image to output as a superimposed image.

2. The image processing apparatus of claim 1, wherein the circuitry changes the transparency-process color information from the first color value to the second color value when the comparison result of the color value of the non-transparency region and the first color value exceeds a given threshold.

3. The image processing apparatus of claim 2, wherein the circuitry applies a different value as the given threshold depending on a type of the first image.

4. The image processing apparatus of claim 1, wherein the circuitry processes the process target region when the process target region includes pixels designated by the transparency-process color information.

5. The image processing apparatus of claim 1, wherein the circuitry links a part of a plurality of pixels in the first image having a similar color value and adjacent with each other as one linked region by checking the plurality of pixels composing the first image, and the circuitry processes the one linked region.

6. The image processing apparatus of claim 1, wherein the circuitry links a part of a plurality of pixels in the first image having one similar color value and adjacent with each other as one linked region by checking the plurality of pixels composing the first image, and links another part of the plurality of pixels in the first image having another similar color value and adjacent with each other as another linked region by checking the plurality of pixels composing the first image, and the circuitry processes each of the one linked region and the another linked region.

7. The image processing apparatus of claim 6, wherein when the one linked region and another linked region overlaps at least partially, the circuitry divides the one linked region to obtain a discrete region composed of a pixel designated by the transparency-process color information and a pixel having the one similar color value of the one linked region, and to obtain another discrete region composed of a pixel designated by the transparency-process color information and a pixel having the another similar color value of the another linked region, and the circuitry processes each of the discrete region and the another discrete region.

8. A method of synthesizing a first image including a transparency-process region and a non-transparency region, and a second image, the method comprising:
- storing, in a memory, a first color value as transparency-process color information useable for performing a transparency-process to the transparency-process region of the first image;
- extracting, from the first image, the non-transparency region and a part of the transparency-process region that are adjacent with each other as a process target region;
- comparing a color value of the non-transparency region and the first color value of the transparency-process region that are adjacent with each other and existing in the process target region;
- changing the transparency-process color information from the first color value to a second color value depending on a comparison result of the color value of the non-transparency region and the first color value of the transparency-process region, the second color value being set closer to the color value of the non-transparency region;
- applying the second color value to the transparency-process region existing in the process target region;
- enlarging an image size of the process target region having the transparency-process region applied with the second color value in view of an image size of the second image;
- performing the transparency process to the enlarged process target region based on the second color value; and
- superimposing the enlarged process target region having received the transparency process on the second image to output as a superimposed image.

9. A non-transitory storage medium storing a program that, when executed by a computer, causes the computer to execute a method of synthesizing a first image including a transparency-process region and a non-transparency region, and a second image, the method comprising:
- storing, in a memory, a first color value as transparency-process color information useable for performing a transparency-process to the transparency-process region of the first image;
- extracting, from the first image, the non-transparency region and a part of the transparency-process region that are adjacent with each other as a process target region;
- comparing a color value of the non-transparency region and the first color value of the transparency-process region that are adjacent with each other and existing in the process target region;
- changing the transparency-process color information from the first color value to a second color value depending on a comparison result of the color value of the non-transparency region and the first color value of the transparency-process region, the second color value being set closer to the color value of the non-transparency region;
- applying the second color value to the transparency-process region existing in the process target region;
- enlarging an image size of the process target region having the transparency-process region applied with the second color value in view of an image size of the second image;
- performing the transparency process to the enlarged process target region based on the second color value; and
- superimposing the enlarged process target region having received the transparency process on the second image to output as a superimposed image.

* * * * *